June 7, 1966 W. S. STRASZEWICZ 3,255,407

HARMONIC DISTORTION METER AND INDICATOR
HAVING CIRCULAR CRT TRACE

Filed Oct. 30, 1961

INVENTOR
W. S. STRASZEWICZ
BY John M. Calimafde
ATTORNEY 3,255,407
Patented June 7, 1966

3,255,407

HARMONIC DISTORTION METER AND INDICATOR HAVING CIRCULAR CRT TRACE

Witold Stefan Straszewicz, Nowowiejska 22/25, Warsaw, Poland

Filed Oct. 30, 1961, Ser. No. 148,430
3 Claims. (Cl. 324—57)

This invention relates to measurement of the harmonic distortion which is induced in electrical signals by imperfections in electrical amplifiers, transmission lines, coupling networks, or other devices which are adapted to pass electrical signals. The invention is characterized by a novel visual display which provides both a qualitative and a quantitative measure of total harmonic distortion. Although the invention is applicable to the measurement of harmonic distortion in general, it is particularly useful in the manufacture and testing of high quality electrical devices, or in other applications where a quick, accurate quantitative and qualitative measure of harmonic distortion is required.

In electrical components such as amplifiers, transmission lines, or the like, there is always some distortion of the electrical signals passed therethrough because of non-linearities in the components. If the electrical signal is a pure sine wave, these distortions will appear in the output signal as harmonics of the sine wave frequency, with the amplitude and distribution of the harmonics being determined by the type and degree of non-linearity in the component. In the manufacture, testing, and repair of electrical components it is often necessary to get an exact measure of the percent of distortion that would be caused by non-linearities and other imperfections in the component. This is particularly important in voice, video, or telegraph system components, which have to fall within predetermined distortion tolerances to be workable in their respective circuits. Therefore many harmonic distortion meters have been devised in the past to measure these distortions. All of the prior art distortion meters have operated on the principle of applying a pure sine wave to the component being tested and then analyzing the output signal from the component in a wave analyzer of one sort or another. The harmonic distortion meter and indicator of this invention follows this general prior art principle, but it provides a novel wave analyzer which has many significant advantages over the prior art wave analyzers.

One common prior art wave analyzer comprised a narrow band, tunable amplifier which was precisely calibrated in terms of bandwith, gain, and output amplitude. The band pass of this amplifier was narrow enough to separate the fundamental frequency from its harmonics, whereby the amplitudes of the fundamental and harmonics could be measured by tuning the amplifier to the proper frequency and measuring its output amplitude at that frequency. The percent of distortion with respect to the individual harmonics could then be computed by the formula (a)

$$h_x = \frac{U_x}{U_1} \cdot 100\%$$

where $U_1$=the amplitude of the fundamental frequency,
$Ux$=the amplitude of the $X$th harmonic frequency, and
$hx$=the percent of the $X$th harmonic distortion in the composite signal When harmonic distortion had been computed for the most significant harmonic frequencies, the total harmonic distortion $h$ could be approximated from the formula (b)

$$h \approx \sqrt{\frac{\sum_{x=2}^{x=n} U_x^2}{U_1^2}} \cdot 100\%$$

or (c)

$$h \approx \sqrt{\frac{\sum_{x=2}^{x=n} U_x^2}{U_1^2 + \sum_{x=2}^{x=n} U_x^2}} \cdot 100\%$$

Although this wave analyzer was workable, it had several serious drawbacks. In the first place, it required several measurements and calculations to determine the total harmonic distortion, which is time consuming and inconvenient, particularly in manufacturing operations. In the second place, the device was subject to errors due to frequency drift in the sine wave source that was used to product the test signal for the component under measurement. Unless this sine wave source was extremely stable, it was not possible to measure very small distortions ($h<1\%$) with this device, or to achieve a high accuracy in measuring large distortions.

A somewhat simpler prior art wavemeter comprised a tunable, narrow band filter which was tuned to remove the fundamental frequency from the composite signal to get a measure of everything that remained, which would, of course, be the harmonics. This tunable filter was somewhat easier to operate than the first mentioned wave analyzer, but it did not provide any information about the relative amplitude of the individual harmonics, nor did it identify the dominant harmonic, which is quite important in many applications. Furthermore, the operation of this device is also relatively time consuming, because the fundamental frequency has to be tuned out by gradual approaches and repeated measurements. In addition, the tunable filter is also subject to errors due to frequency drift in the sine wave source. As a result, this method is not useful in measuring very small distortions such as found, for example, in high fidelity audio components.

The most accurate prior art wave analyzer is the spectrum analyzer, which simultaneously displays the entire frequency spectrum of a composite signal on the face of a cathode ray tube. In this display the signal is represented by a family of lines whose position indicates frequency and whose length equals the amplitude of the signal component for the corresponding frequency. A more accurate measure of distortion can be made with this instrument, but this is more complex, more costly, and more time consuming than the other prior art wave analyzers. For these reasons the spectrum analyzers are used primarily as laboratory instruments.

It can be seen then that there exists a need for a simple, accurate, easily operated harmonic distortion meter which is adapted for use in mass production manufacturing of electrical components, in field testing of communication systems, and in the repair of communication systems and components. Accordingly, one subject of this invention is to provide a simple, accurate, easily operated harmonic distortion meter of this type.

Another object of this invention is to provide a harmonic distortion meter containing a simple, easily read indicator which provides both a qualitative and a quantitative measure of harmonic distortion.

A further object of this invention is to provide a harmonic distortion meter which does not require tuned circuits and which is not subject to error due to frequency drift in its sine wave source.

Other objects and advantages of this invention will become apparent to those skilled in the art from the following description of one specific embodiment thereof, as illustrated in the attached drawings, in which.

Figures 1, 2, 3:
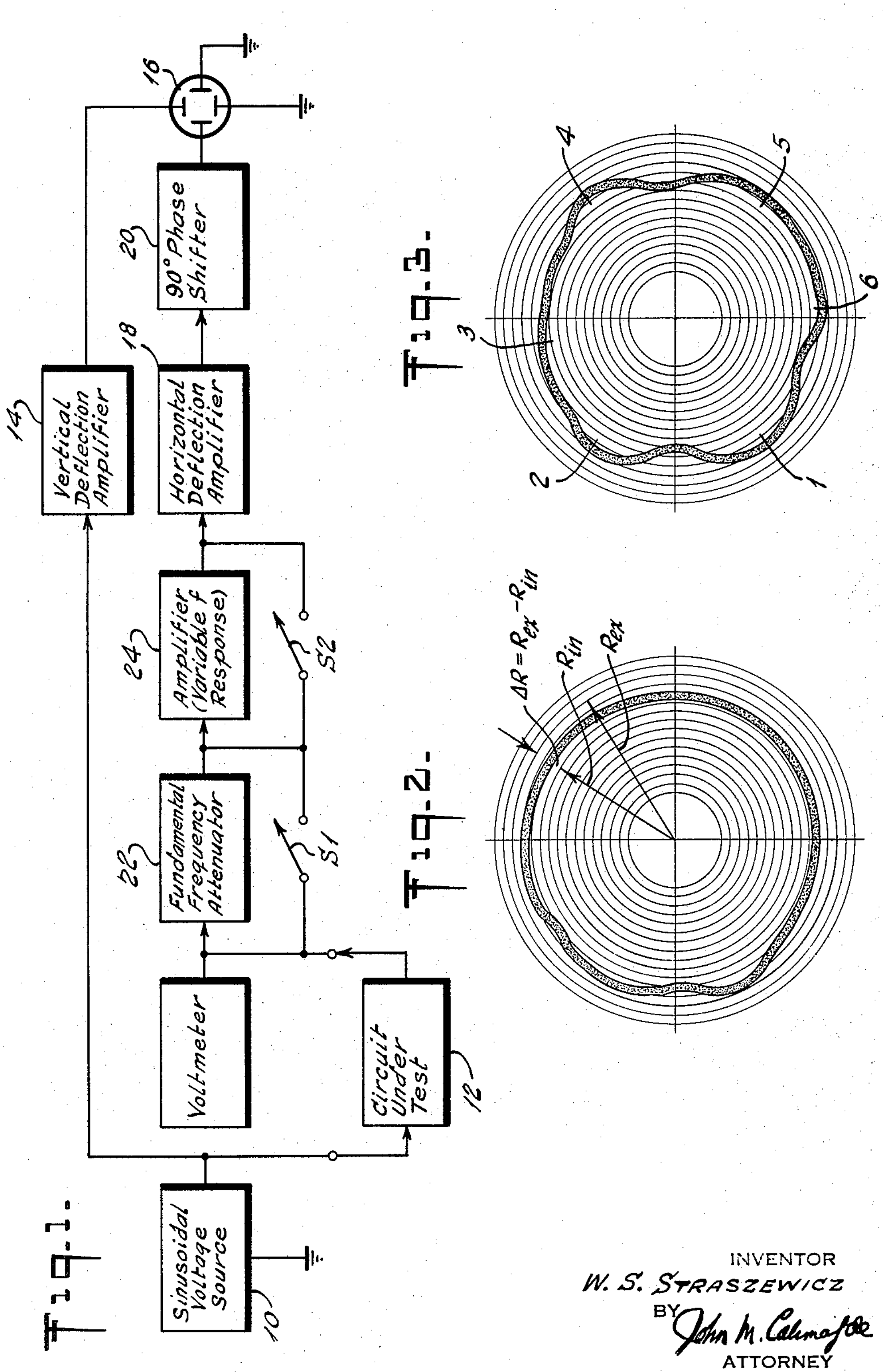
FIG. 1 is a block diagram of one illustrative embodiment of the invention.
FIG. 2 is a plan view of the cathode ray tube display of this invention under a first set of conditions.
FIG. 3 is a plan view of the cathode ray tube display of this invention under a second set of conditions.

In general terms, the harmonic distortion meter and indicator of this invention operates by applying a pure sinusoidal test voltage to the electrical component or circuit under test; applying the sinusoidal test voltage to one pair of deflection plates in a cathode ray tube, shifting the phase of the output voltage from the circuit under test by 90° and applying this phase-shifted voltage to the other deflection plates of the cathode tube. If no distortion is introduced by the circuit under test, the display on the face of the cathode ray tube will be a perfect circle, but if distortion is introduced by the circuit under test, the circle will be distorted by an amount corresponding to the amount of the distortion. A set of concentric circles is marked on the face of the cathode ray tube, and the exact percentage of distortion is computed from the difference between the radius of the smallest circle and the largest circle which touch the displayed trace of the cathode ray tube. The shape of the displayed trace indicates the dominant harmonic in the total distortion, and also the approximate harmonic distribution of the total distortion. In accordance with a further aspect of this invention, the fundamental frequency is attenuated in the distorted signal to further emphasize the distortions in the cathode ray tube display so that very small distortion can be quickly measured thereon. In accordance with another specific aspect of this invention, the higher harmonic of the distorted signals are emphasized to get an accurate measure of the higher frequency components of distortion, which are usually much smaller in amplitude than the lower frequency components of distortion.

Referring to FIG. 1, one specific embodiment of the invention comprises a sinusoidal voltage source 10 which is coupled to a circuit under test 12 and to the vertical deflection amplifier 14 of a cathode ray tube 16. The output voltage from the circuit under test 12 is applied through switches S1 and S2 to the horizontal deflection amplifier 18 of cathode ray tube 16. The output of horizontal deflection amplifier 18 is shifted in phase by 90° in phase shifter 20, whose output signal is applied to the horizontal deflection plates of cathode ray tube 16. The face of cathode ray tube 16 is calibrated with a set of concentric circles, as shown in FIGS. 2 and 3, and the percentage of total distortion introduced by the circuit under test 12 is measured by noting the difference $\Delta R$ (FIG. 2) between the radius of the smallest circle ($R_{IN}$) which touches the displayed trace and the radius of the largest circle ($R_{EX}$) which touches the displayed trace. The percentage of distortion can be calculated from the formula $$h=\frac{\Delta R}{R_{IN}+\frac{\Delta R}{2}}\cdot 100\%$$

where $$\Delta R=R_{EX}-R_{IN}$$

It should be noted that the accuracy of measurement in the above described circuit is independent of the frequency of the test signal, and that no tuned circuits are required in the basic circuit. Since the deflection plates of the cathode ray tube are each driven from the same test signal source, any errors due to frequency drift in the test signal will be cancelled out in the display, which will be a perfect circle at any frequency if there is no distortion in the circuit under test. And since there are not circuits to be tuned, measurements can be made very quickly in comparison with the time required to make measurements with the prior art devices, which had to be carefully tuned before each measurement. The accuracy and sensitivity of measurement with this basic circuit depends, of course, on the diameter of the cathode ray tube. With a 5″ diameter cathode ray tube the sensitivity of measurement is below $h=1\%$, and much greater sensitivities can be achieved by merely increasing the diameter of the cathode ray tube. The dominant harmonic in the distorted signal can be quickly determined by comparing the shape of the display to the well known Lissajous patterns which are formed when a fundamental frequency is applied to one set of deflection plates of a cathode ray tube and a harmonic thereof to the other set of deflection plates. This can be done quite simply and quickly by counting the number of convexities that appear in the displayed signal trace, as shown in FIG. 3, where the numbers indicate convexities, and by observing their shape, distribution, and magnitude in comparison with known Lissajous patterns.

In accordance with a further feature of the invention, the sensitivity of measurement in the above described distortion meter and indicator can be increased by switching a fundamental frequency attenuator 22 into the circuit to attenuate the fundamental frequency in the distorted sigal and leave primarily the distortion components. Attenuator 22 is switched into the circuit by opening switch S1. Attenuator 22 does not have to entirely remove the fundamental frequency, as was done in the prior art devices, but must rather reduce the amplitude of the fundamental frequency by 10 to 15 decibels. With a 5″ cathode ray tube this increases sensitivity so that distortions much lower than $h=0.1\%$ can be accurately measured. This sensitivity can, of course, be further increased by further attenuating the fundamental frequency.

To facilitate measurement of the very high harmonics in the distorted signal, an amplifier 24 can be switched into the circuit by opening switch S2. Amplifier 24 has a variable frequency response which is adapted to emphasize the higher harmonics of distortion with respect to the lower harmonics thereof. Amplifier 24 can also be used to compensate for any attenuation of the higher frequency components in horizontal deflection amplifier 18 or phase shifter 20. Thus it may be desirable to switch amplifier 24 into the circuit for normal measurements, with its frequency response adjusted to emphasize the higher harmonic just enough to compensate for any high frequency attenuation in circuits 18 and 20.

Although this invention has been described in connection with a specific embodiment thereof, it should be understood that many modifications can be made in the structure disclosed with departing from the basic teachings of this invention. For example, when a sinusoidal voltage source having a high output voltage is used, it is possible to apply the voltage source signal and the phase shifted output signal from the circuit under test directly to the deflection plates of the cathode ray tube and to thus eliminate the need for vertical and horizontal deflection amplifiers. This arrangement would, in fact, be preferable where extremely small distortions are to be measured or where extremely high accuracy is required in the measurements of distortion. It will be appreciated by those skilled in the art that these deflection amplifiers add small amounts of distortion to the signal and that they will therefore introduce small errors into the circuit. Also, it is possible to place the phase shifter in the undistorted signal coupling path rather than in the distorted signal coupling path as shown herein. Furthermore, it is not necessary to apply the distorted signal to the horizontal deflection plates and the undistorted signal to the vertical deflection plates of the cathode ray tube; these signals inputs could just as well be reversed if desired. These and many other modifications of the structure disclosed herein will be apparent to those skilled in the art, and this invention includes all modifications falling within the scope of the following claims.

I claim:

1. A harmonic distortion meter and indicator for measuring and indicating the distortion characteristics of a circuit under test comprising: sinusoidal voltage source means, a cathode ray tube containing a set of horizontal deflection plates and a set of vertical deflection plates, first circuit means coupling, said sinusoidal voltage source means to one set of deflection plates and second circuit means for serially coupling said voltage source to a circuit under test to apply an input test signal thereto, 90° phase shifting circuit means serially coupled to the output of said circuit under test, the output of said 90° phase shifting means being coupled in series to the other set of deflection plates of said cathode ray tube, and the face of said cathode ray tube being calibrated with a set of concentric circles, whereby the harmonic distortion introduced into the output of said sinusoidal voltage source by said circuit under test can be calculated from the radius of the largest calibration circle which touches the displayed trace on said cathode ray tube and the radius of the smallest calibration circle which touches said displayed trace thereon.

2. The combination defined in claim 1 and also including a fundamental frequency attenuator means coupled between the output of said circuit under test and the input to said 90° phase shifting means, to attenuate the fundamental frequency component in the output signal from said circuit under test to increase the sensitivity of the meter.

3. The combination defined in claim 2 and also including variable frequency response amplifier means coupled in series between the output of said circuit under test and the input of said 90° phase shifter to emphasize the higher harmonic components of the output signal from said circuit under test with respect to the lower harmonic components thereof.

References Cited by the Examiner

UNITED STATES PATENTS

| | | | |
|---|---|---|---|
| 1,768,262 | 6/1930 | Marrison | 324—88 |
| 2,782,366 | 2/1957 | Wall | 324—57 |
| 2,905,886 | 9/1959 | Hupert et al. | 324—57 |
| 3,017,573 | 1/1962 | Hoffman | 324—77 |
| 3,056,921 | 10/1962 | Flarity | 324—57 |
| 3,150,316 | 9/1964 | Davis | 324—85 X |

FOREIGN PATENTS

| | | |
|---|---|---|
| 866,257 | 4/1961 | Great Britain. |

OTHER REFERENCES

Linearity Tests With an Oscilloscope, article in Radio and Television News, pp. 66, 67, 157, June 1950.

Measure Harmonic Distortion, article in Radio-Electronics, June 1959, pp. 70, 72.

Measurement of Harmonic Distortion, article in Wireless World, November 1961, pp. 576–581.

A Phase Indicator for Color Television, article in Electronics, October 1952, pp. 112–114.

WALTER L. CARLSON, *Primary Examiner.*

A. E. RICHMOND, E. E. KUBASIEWICZ, *Assistant Examiners.*